United States Patent
Gasser (10) Patent No.: US 10,824,374 B1
(45) Date of Patent: Nov. 3, 2020

(54) SYSTEM AND METHOD FOR STORAGE VOLUME COMPRESSION

(71) Applicant: Amazon Technologies, Inc., Seattle, WA (US)

(72) Inventor: Timothy David Gasser, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 32 days.

(21) Appl. No.: 16/017,871

(22) Filed: Jun. 25, 2018

(51) Int. Cl.
*G06F 3/06* (2006.01)

(52) U.S. Cl.
CPC ............ *G06F 3/0661* (2013.01); *G06F 3/064* (2013.01); *G06F 3/067* (2013.01); *G06F 3/0608* (2013.01)

(58) Field of Classification Search
None
See application file for complete search history.

(56) References Cited

U.S. PATENT DOCUMENTS

| | | | | |
|---|---|---|---|---|
| 8,478,731 B1* | 7/2013 | Throop | ............... | G06F 16/1744 707/693 |
| 2008/0072003 A1* | 3/2008 | Vu | ........................ | G06F 3/0617 711/162 |
| 2008/0307191 A1* | 12/2008 | Lane | ...................... | G06F 3/0608 711/209 |
| 2009/0112949 A1* | 4/2009 | Ergan | ................... | G06F 12/0802 |
| 2010/0037031 A1* | 2/2010 | DeSantis | ............. | G06F 11/1461 711/162 |
| 2011/0218974 A1* | 9/2011 | Amit | ....................... | G06F 16/00 707/693 |
| 2014/0143517 A1* | 5/2014 | Jin | ......................... | G06F 3/0608 711/171 |
| 2014/0181441 A1* | 6/2014 | Kottomtharayil | ... | G06F 11/1458 711/162 |
| 2015/0193342 A1* | 7/2015 | Ohara | .................. | G06F 12/0873 711/120 |
| 2018/0307441 A1* | 10/2018 | Auvenshine | .......... | G06F 3/0608 |

* cited by examiner

*Primary Examiner* — William E. Baughman
(74) *Attorney, Agent, or Firm* — Nicholson De Vos Webster & Elliott (57) ABSTRACT

Intelligent compression of data storage volumes in a service provider system. For example, in one embodiment of a computer-implemented method, attachment metrics are compiled for block storage volumes coupled to a storage server. The attachment metrics may include temporal data related to block storage volume detachments and attachments in relation to a plurality of compute instances; and prioritizing compression of the block storage volumes based on the attachment metrics; and compressing the block storage volumes in accordance with the prioritization.

20 Claims, 9 Drawing Sheets

SYSTEM AND METHOD FOR STORAGE VOLUME COMPRESSION

BACKGROUND

Computer networks today are used to interconnect a variety of heterogeneous computing systems which provide the data processing, storage, and networking services required by organizations. These computing systems may be co-located (e.g., as part of a local network) or instead located in multiple distinct geographical locations (e.g., connected via one or more private or public intermediate networks). For example, data centers housing a significant number of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that include all of the hardware and software required by their customers. However, as the scale and scope of typical data centers has increased, the tasks of provisioning, administering, and managing the physical computing resources have become increasingly complicated.

Virtualization technologies are often used for managing large-scale computing resources for many customers with diverse needs, allowing different computing resources to be efficiently and securely shared by multiple customers. For example, virtualization technologies may allow a single physical computing machine to be shared among multiple customers by providing each customer with one or more virtual machines hosted by the single physical computing machine. Each such virtual machine is a software simulation acting as a distinct logical computing system that provides users with the illusion that they are the sole operators and administrators of a given hardware computing resource. Various security techniques are implemented to ensure application isolation among the various virtual machines. Furthermore, some virtualization technologies are capable of providing virtual resources that span two or more physical resources, such as a single virtual machine with multiple virtual processors that span multiple distinct physical computing systems. As another example, virtualization technologies allow data storage hardware to be shared among multiple users by providing each user with a virtualized data store distributed across one or multiple physical data storage devices. In such an implementation, each user is provided with limited access to only those virtualized portions of the physical data storage devices which are allocated to that user.

BRIEF DESCRIPTION OF DRAWINGS

Various embodiments in accordance with the present disclosure will be described with reference to the drawings, in which.

DETAILED DESCRIPTION

Techniques for data storage volume compression are described below which compress detached data storage volumes based on an analysis of recent and/or historical attachment patterns for those data storage volumes. In some embodiments, a volume usage analyzer monitors the frequency with which detached data volumes provided by a storage server have been re-attached (e.g., to compute instances) over a period of time and, using this data, identifies detached volumes to be compressed to conserve storage space. Accordingly, embodiments may compress those volumes which are least likely to be re-attached within a specified window of time (e.g., in the next day, week, month, etc).

In one embodiment, other data processing activities on the storage server are not impeded during the compression of volumes, and the durability of the compressed data volumes is unaffected. In addition, compressed data volumes may be decompressed in a manner that hides the latency of decompression (e.g., running as a low priority or background thread/task). Consequently, the latency of compression and decompression, in at least one embodiment, is transparent to an end user seeking to utilize data volumes.

A block storage service is employed in one embodiment which includes a plurality of block storage servers and mass storage devices for storing data in blocks of a specified size within the storage volumes. The mass storage may be implemented, for example, as magnetic hard disk drives (HDDs) or solid state drives (SSDs). One particular block storage service which may be used is the Elastic Block Storage (EBS) service. The EBS service uses a client-server architecture in which compute instances (e.g., virtual machines such as Elastic Compute Cloud ("EC2") instances offered as a service) are configured with EBS clients which connect to EBS servers over a network link. EBS servers include a number of mass storage devices on which EBS volumes are configured. In one embodiment, each EBS volume is stored in at least two EBS servers for durability reasons (referred to as Master and Slave volumes). While some embodiments use an EBS/EC2 implementation, the underlying techniques described herein are not limited to any particular set of storage devices/platforms.

Figure 1:
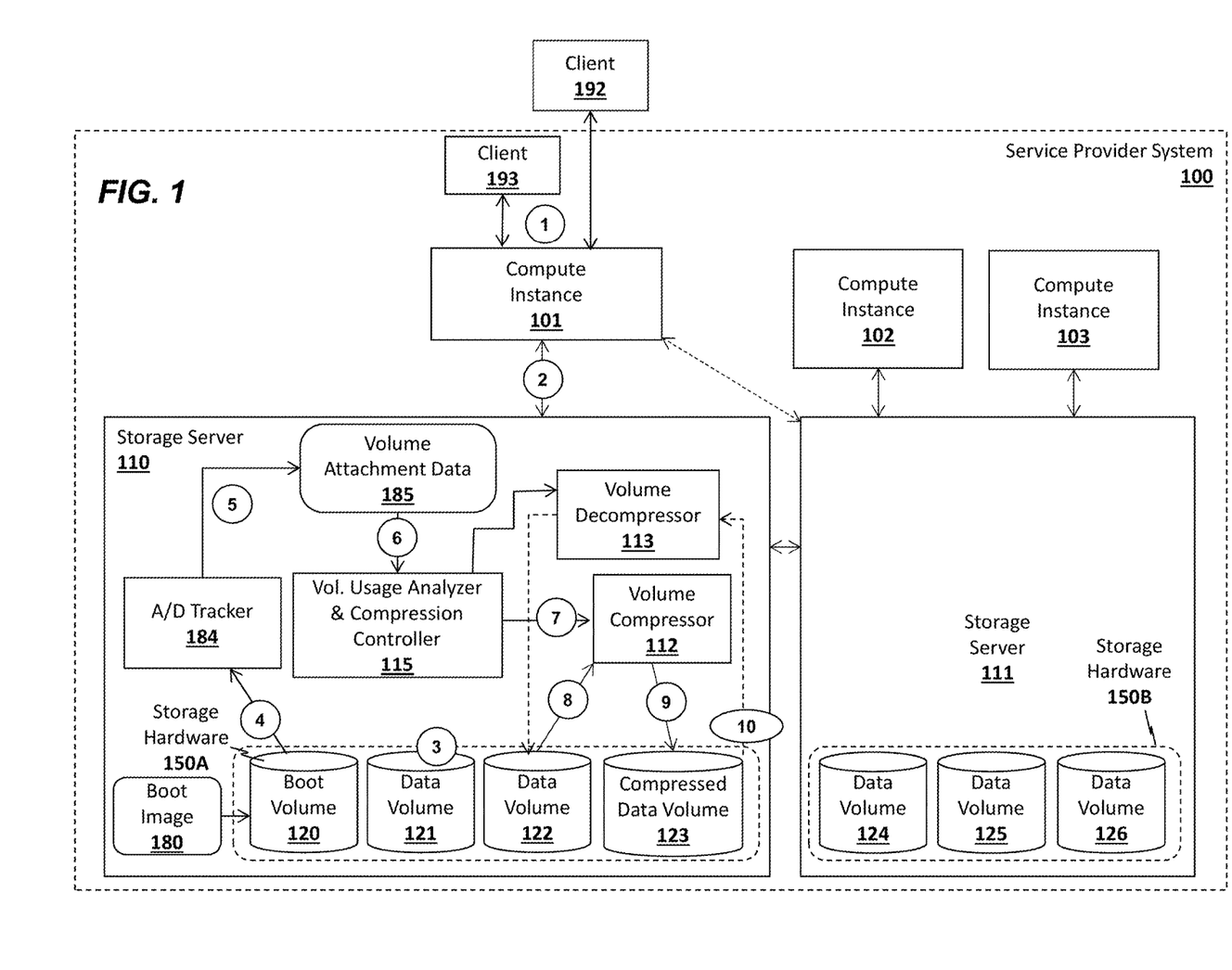
FIG. 1 illustrates a service provider system which performs compression of data volumes.

FIG. 1 illustrates one embodiment of a block storage server architecture in which a plurality of compute instances 101-103 are communicatively coupled to a plurality of storage servers 110-111 over a network. In one embodiment, the storage servers 110-111 are block storage servers which store data in blocks of a designated size on a plurality of data volumes 121-122, 124-126. The data volumes are collectively referred to herein as storage hardware 150A-B. The block size used may be fixed or variable based on the storage requirements of each volume. Various mappings between the instances 101-103, storage servers 110-111, and data volumes 121-122, 124-126 may be employed. For example, a compute instance 101 may be simultaneously coupled to multiple storage servers 110-111, a particular storage server 111 may be coupled to multiple compute instances 102-103, and/or a storage server 110-111 may be coupled to any set of data volumes 121-122, 124-126.

In one embodiment, multiple copies of each storage volume are maintained to ensure volume durability. For example, one data volume such as data volume 122 is designated a "master" data volume and another data volume 124 (potentially on a different storage server 111) is designated a "slave" data volume which is updated continuously in response to updates to the master data volume 122. Thus, in this implementation, the slave data volume 124 includes a duplicate copy of the master data volume 122 and may be used to recover data if the master data volume 122 is lost or corrupted. To ensure durability, the slave data volume 124 may be located in a different server rack, in a different data center location (e.g., on a different floor), or a different building from master data volume 121. The compression/decompression techniques described herein may be applied to the master data volume 122, the slave data volume 125, or both.

A storage server 110 may also manage one or more boot volumes 120 storing program code such as hypervisor program code, drivers, virtual machines, operating system code, and/or applications required to boot and initialize each compute instance 101-103 (e.g., a boot image 180 as shown in FIG. 1). In one embodiment, when a compute instance 101 is started up, it first loads program code from its local storage (e.g., basic I/O code and network drivers) to enable it to establish a connection with storage server 110 to access the boot volume 120. Once a connection is established, the boot program code is transmitted from the storage server 110 to the compute instance 101 over the network.

Referring to FIG. 1, the service provider system 100 may utilize one or more of different types of instances 101-103 such as virtual machines (VMs) or other virtual computing arrangements, data/storage resources (e.g., object storage, block-level storage, data archival storage), networking resources (e.g., configuring virtual networks including compute resources, content delivery networks, Domain Name Service (DNS) systems, network address management systems), and/or application resources (e.g., databases, application build/deployment services), to name a few. The one or more instances 101-103 can be implemented using a single electronic server device or may be spread across multiple electronic server devices. Thus, a user may directly utilize a compute instance hosted by the service provider system to perform various computing tasks, or may indirectly utilize a compute instance running as a "back end" service on the service provider's network and executing code in response to requests from "front end" servers which are directly accessed by the user (e.g., without the user having any control of or knowledge of the underlying compute instance(s) involved). The underlying principles of the described embodiments are not limited to any particular implementation of compute instances.

For the sake of discussion, it will be assumed that the service provider system 100 utilizes virtualization techniques to provide its compute services to users/customers. In such embodiments, the plurality of instances 101-103 are compute instances which comprise virtually partitioned sets of computing resources such as CPUs and memory. The compute instances 101-103, for example, may include one or more virtual machines and/or guest operating systems (OSs) executed on a hypervisor or virtual machine monitor (VMM) (which may or may not operate on top of an underlying host OS), containers which may or may not operate within a VM, and/or compute software engineered with native program code for executing on "bare metal" hardware without an underlying hypervisor/VMM.

The compute instances 101-103 are accessed by external clients 192 such as users connecting to the service provider system over the Internet and/or internal clients 193 such as other services running within the service provider system 100 (e.g., front end servers such as Web servers or back end servers running business logic or other application program code which require access to the compute resources offered by the instances 101-103). Thus, the term "client" may refer to both traditional end-user devices such as personal computers, tablets, smartphones, and server-based software running within the service provider system 100 or coupled to the service provider system 100 via a public or private network.

In an embodiment in which TCP/IP is used as the underlying transport/network protocol, the clients 192-193 use the IP address associated with the compute instance 101 to establish a packet-based communication channel with the compute instance 101. A client 192-193 submits a compute request to the compute instance 101 over this packet-based communication channel. The compute request is processed by the compute instance 101 which generates a result which it then transmits to the client which originated the request (e.g., client 192 or 193 in FIG. 1). In one implementation, the various instances 101-103 are selected by a load balancer (not shown) to evenly distribute the request workload.

In one embodiment, operations (1)-(9) illustrated in FIG. 1 are implemented as follows. Client 192 or client 193 sends a compute request at (1) to a compute instance 101 (generally via a load balancer, not shown), which is connected to one or more storage servers 110 over the network at (2) that host one or more volumes used by the compute instance. For example, the data required for the compute request may be stored in a volume on the storage server 110, which may also store the results of the compute request. In response to commands received from the compute instance 101, the compute instance 101 accesses data on the volume like it was physically attached to the compute instance 101 (e.g., performing read/write operations in response to execution of compute instance program code).

In one embodiment, an attachment/detachment tracker 184 monitors attachments/detachments of each of the volumes 120-123 at (4) and at (5) compiles volume attachment data 185 for each of the data volumes 121-122, 124-126 (as described in greater detail below). The volume attachment data 185 includes statistics related to the attachment frequency and/or timing associated with attachment/detachment of each data volume 121-122, 124-126. A volume usage analyzer and compression controller 115 obtains and evaluates the attachment data 185 at (6) to prioritize the data volumes for compression by volume compressor 112 at (7). In one embodiment, only those data volumes which are currently detached are considered by the volume usage analyzer and compression controller 115 for prioritization. The goal of the volume usage analyzer and compression controller 115 in one embodiment is to anticipate the volumes that will not need to be reattached for an extended period of time based on its analysis of the attachment data 185. Different types of analysis may be performed using different attachment data, including but not limited to a statistical analysis (e.g., such as an Empirical Bayes analysis as described below). Regardless of how the data volumes are prioritized, a volume compressor 112 compresses data volume 122 at (8) (e.g., using a lossless compression algorithm known to those of skill in the art) to generate compressed data volume 123 at (9).

One embodiment of the storage server 110 may also include a volume decompressor 113 to decompress the compressed data volume 123 at (10) and thereby regenerate the uncompressed data volume 122. By way of example, and not limitation, the decompression at (10) may be performed in response to a re-attachment of the data volume 122 by the customer or may be a scheduled decompression (as described below). In certain embodiments described below, the volume decompressor 113 decompresses certain portions of the volume before other portions to allow the customer to access these portions before the entire data volume 122 has been decompressed.

In FIG. 1, the volume analysis and compression is performed on a storage server 110. In an alternate embodiment illustrated in FIG. 2, the attachment analysis and volume compression are performed by a separate volume monitoring service 200 accessible by the storage servers 110-111 within the service provider system 100. In one specific implementation, the volume monitoring service 200 comprises a control plane component of the service provider system 100 (e.g., such as the CloudWatch monitoring service).

Figure 2:
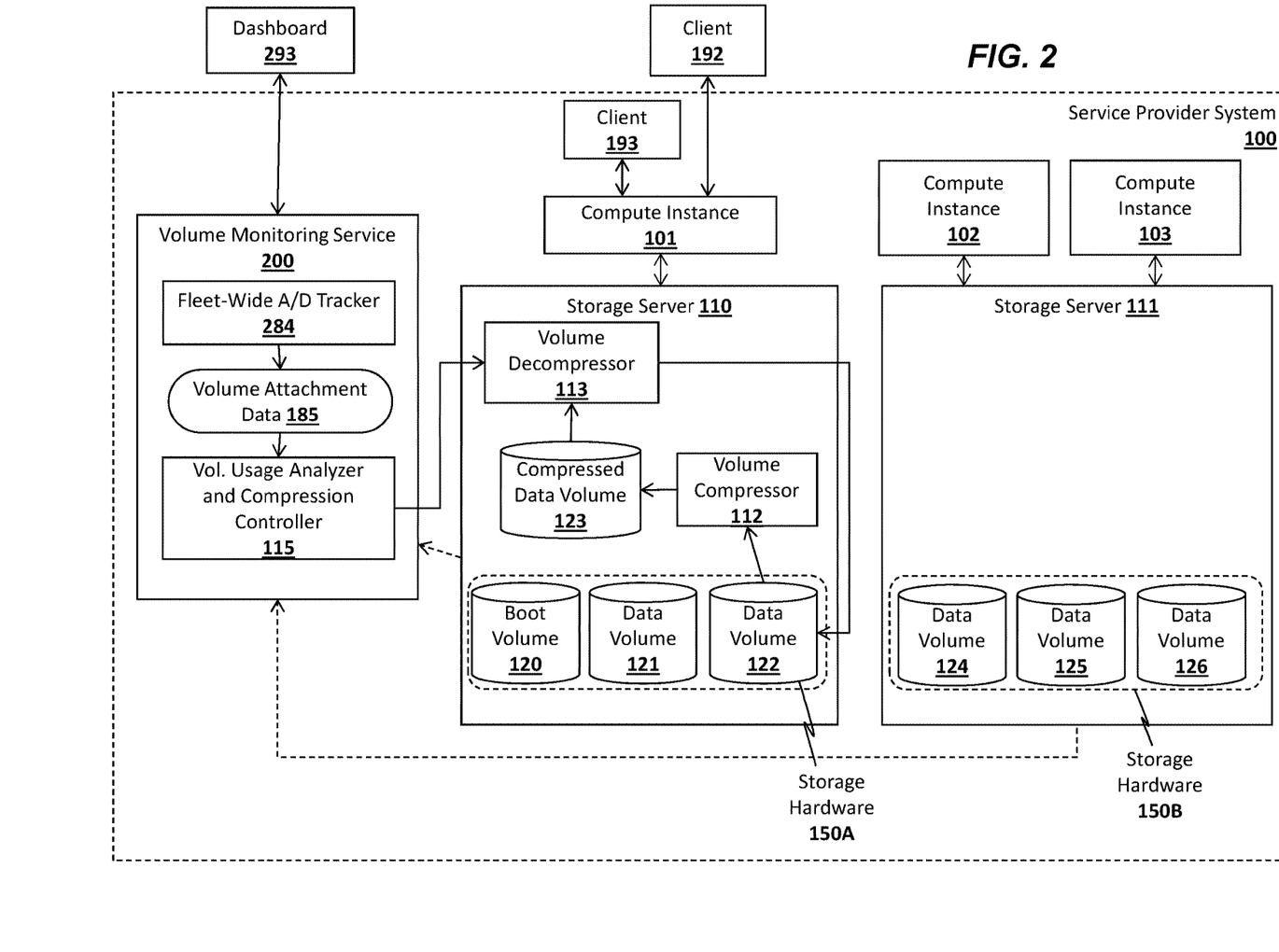
FIG. 2 illustrates another service provider system which performs compression of data volumes.

In this embodiment, the volume monitoring service 200 collects the volume attachment data 185 (and optionally other relevant data) from the various block storage servers 110-111 (e.g., from an A/D tracker 184 as shown in FIG. 1) and/or instances 101-103. In another embodiment, the volume attachment data 185 is collected and distributed by a separate control plane component associated with the storage servers 110-111 and/or instances 110-111. As in the embodiment in FIG. 1, the volume usage analyzer and compression controller 115 may then evaluate the volume attachment data 185 to determine a prioritization for volumes to be compressed by the volume compressor 112.

In one implementation, the block storage servers 110-111 store a duplicate copy of every data volume 121-122, 124-126 for durability, with one data volume designated as a master and the backup data volume configured as a slave, which stores copies of the write operations performed on the master. Ideally, the master and slave data volumes are stored in different physical locations (e.g., on different racks, in different buildings, in different geographic areas) to improve durability.

In one embodiment, each block storage server 110-111 has two resources which are consumed by the volumes it hosts: (1) block access traffic, and (2) customer storage bytes. In one embodiment, the block access traffic includes data communication between the compute instances 101-103 and the volumes 120-126. This may comprise "foreground" read/write traffic and "background" traffic from other sources such as volume creations from snapshots, or snapshot creations from volumes. In various embodiments, the traffic can be measured using dimensions such as throughput (MiB/s), Input/output Operations per Second (IOPS), etc.

Customer storage bytes are the primary storage resource used by the system to store customer data and may be measured as billable customer storage bytes (i.e., storage bytes being consumed at a specified cost per byte). In one implementation, each block storage server 110-111 has a finite number of mass storage devices connected, each of which has a fixed number of bytes.

Block storage volumes have a number of stages in their lifecycle including the "attached" and "detached" stages mentioned above. In one embodiment, the complete set of stages include "created," "attached," "detached," and "deleted." Storage volumes may be created from scratch or from a machine image. In an embodiment which uses EC2 instances, the machine image may comprise an Amazon Machine Image (AMI) which is a predetermined volume image commonly used to boot an EC2 instance's Operating System (OS). If a volume is used to boot an operating system, this is termed a boot volume 120. Volumes created from scratch by a customer are called data volumes 121-126.

When "attached," a data volume 121-122, 124-126 is connected to a compute instance 101-103 via a block storage server 110-111. As such, traffic can be directed between the compute instances 101-103 and data volumes 121-122 124-126 for reading and writing the underlying data. In this state, the size and composition of a data volume 121-122, 124-126 can change due to customer writes or deletions.

In one embodiment, a "detached" volume is occupying storage space (i.e., it's stored) on a block storage server 110-111 (optionally with a duplicate copy for durability) but it is no longer connected to a compute instance 101-103, so no customer traffic can be driven to the volume. Customers may be billed (e.g., by the GB-month) for detached volumes since these volumes occupy space that otherwise could be used to store volumes for other customers, even though they cannot access their data without re-attaching such volumes to a compute instance.

A "deleted" volume is one which has been removed from the system. Once customers delete volumes, their data is removed from the block storage server 110-111. At this stage, customers are no longer billed for these volumes. Typically, customers will snapshot the volume to store a copy of it in an object store prior to deleting the volume so the volume can be reconstituted by using the snapshot.

In summary, when a volume is in the created, attached, or detached states it consumes disk space on the block storage server 110-111. When a volume is in the attached state, it may also consume server traffic as driven from the connected compute instance 101-103.

The techniques for volume compression described herein reduce server bytes consumed by volumes in the detached state which consume a sizable proportion of existing storage. For example, if 28% of the data volumes were detached that could translate to hundreds of petabytes or more of unused storage. If these detached volumes were compressed by 50%, a significant amount of billable storage (e.g., again, potentially in the hundreds of petabytes or more) could be freed up and made available to store other volumes.

Figure 3A:
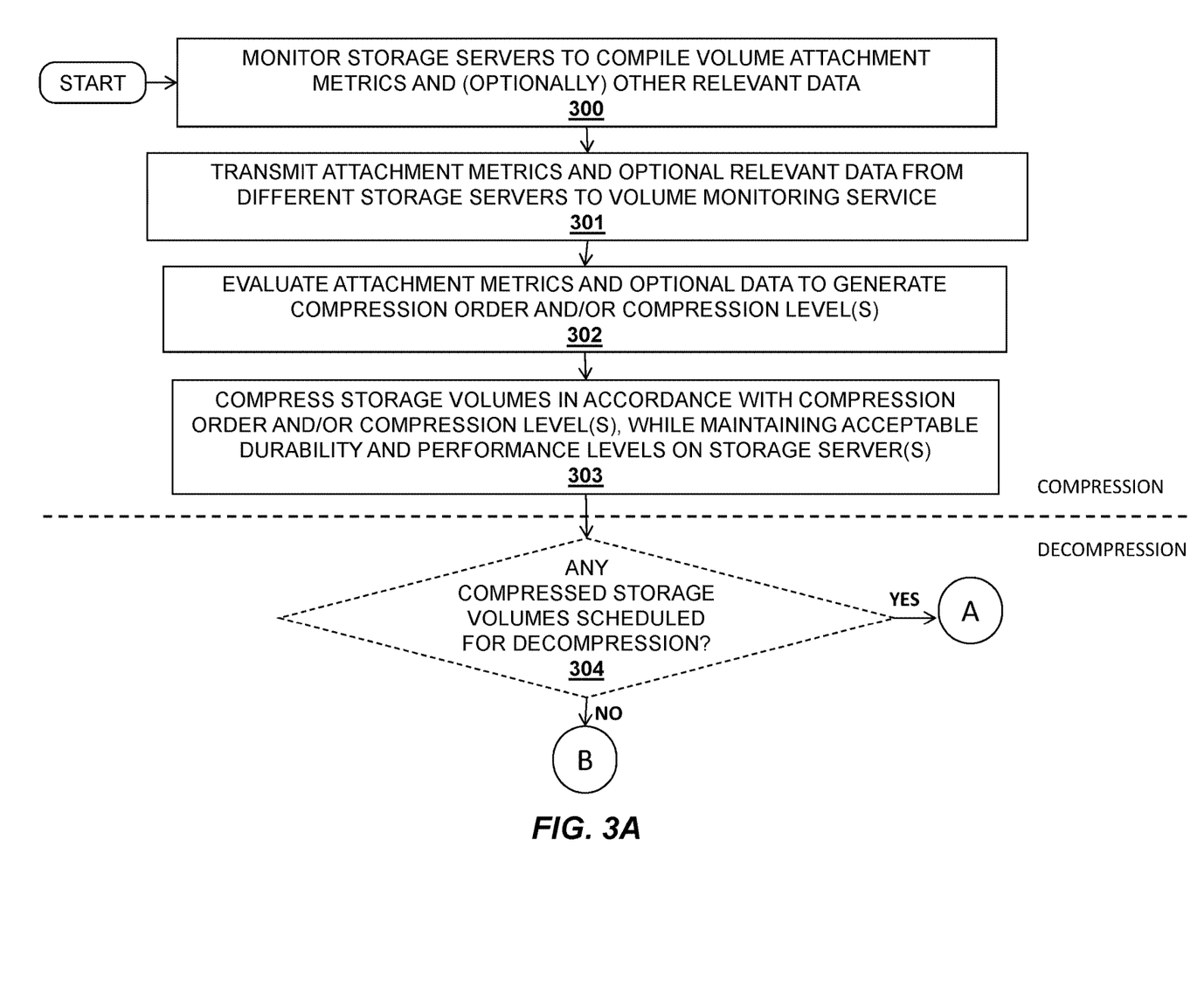
FIGS. 3A-3B illustrate one embodiment of a method for compressing detached storage volumes and re-attaching detached storage volumes.
Figure 3B:
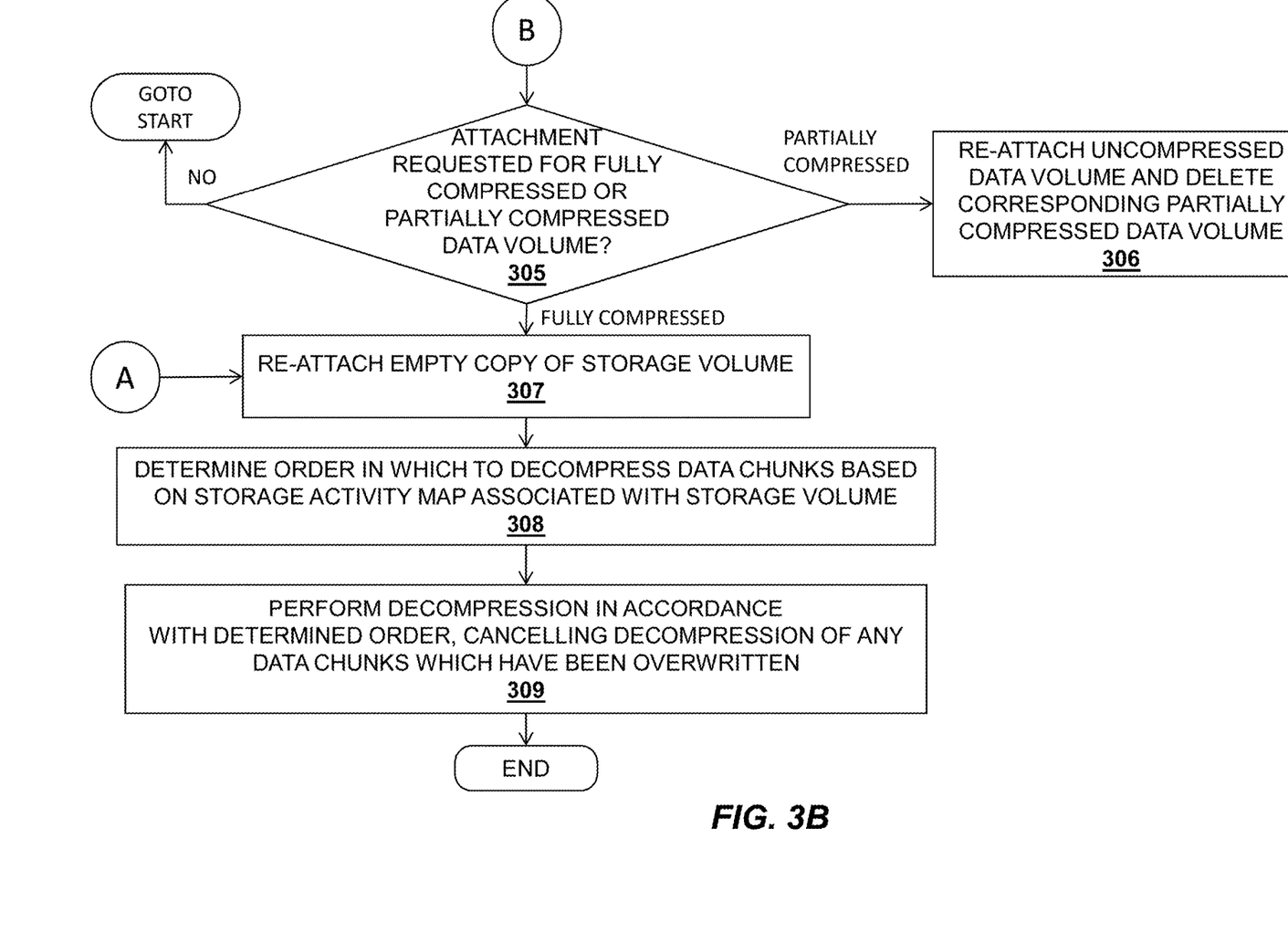

One embodiment of a machine-implemented method for intelligently compressing and decompressing storage volumes is illustrated in FIGS. 3A-B. The method may be executed within the context of the system architectures and platforms described above, but is not limited to any particular architecture or platform.

At 300, the storage servers are monitored to compile volume attachment metrics. In some embodiments, attachment/detachment requests can be monitored indirectly by analyzing the databases that log attachment/detachment requests. As mentioned, other relevant data may also be compiled such as the size of the various storage volumes attached to the storage servers, the frequency with which each storage volume is accessed and the particular storage chunks which are read/written, and the type of data stored on each of the storage volumes (e.g., to determine the compressibility of the data). Specifically, in an embodiment each storage server can periodically send update messages that include the relevant data to a monitoring service.

At 301, attachment metrics are transmitted from different storage servers to a central volume monitoring service. As mentioned, in one embodiment, the volume monitoring service comprises a component of the CloudWatch monitoring service. However, the embodiments of the compression techniques described herein are not limited to this specific implementation.

At 302, the attachment metrics (and optional relevant data) are evaluated by the volume monitoring service to determine patterns, which are then used to determine a compression order and/or compression level for the storage volumes. As mentioned, the attachment metrics may be evaluated by the fleet-wide A/D tracker 284 running on the volume monitoring service 200. The attachment metrics may indicate, for example, the length of time between each detachment and re-attachment of each volume, the frequency with which each volume is detached and re-attached. For example, if a pattern is discovered for particular storage volumes that indicates they are detached for extended periods of time (e.g., months or years), then these volumes may be ordered ahead of other storage volumes which have patterns indicating they are re-attached after shorter periods of time. Accordingly, embodiments can compress those storage volumes which will not need to be reattached (and therefore decompressed) for a significant period of time. Various alternate/additional techniques for ordering are described below, some of which utilize machine learning to discover patterns and prioritize compression candidates.

In one embodiment, the attachment metrics may reveal a periodic pattern of detachments/re-attachments for one or more storage volumes. For example, a particular storage volume may be detached on the same day each month and then re-attached a certain number of days later. When such a pattern has been observed and a high level of confidence is established that the volume will be detached/re-attached according to the pattern, then a compression/decompression schedule may optionally be set to conform with the detach/re-attach pattern. The compression/decompression schedule may be integrated with the embodiments described herein for ordering storage volumes for compression and/or decompression or may be implemented independently, alongside these techniques. For example, once a clear detachment/re-attachment schedule has been identified, this information may be used by the machine learning engine described herein to select the storage volume for compression as soon as it is detached at the scheduled time. Alternatively, an independent compression/decompression schedule may be established, outside of the machine learning techniques described herein.

In one embodiment, while a volume is attached, a storage activity map is maintained to track portions of the data storage volume which are most frequently read and written. As discussed below, the storage activity map may be generated at a "chunk" level granularity where each chunk comprises a particular portion of the storage volume data and the storage activity map includes a value associated with each chunk indicating the read/write activity associated with the chunk. Any chunk size may be selected (e.g., 256 KB, 512 KB, 1 MB, 4 MB, 128 MB, etc.) depending on the amount of attachment metric data to be tracked and the size of the storage volume.

At 303, using one or more of the above techniques, those storage volumes ordered ahead of other storage volumes are compressed, ensuring that an acceptable durability and performance specifications are maintained. For example, the compression operations may be performed as a background task, allowing foreground tasks to have priority on the storage servers 110-111. In one embodiment, "chunks" of data are individually compressed from the block storage volume (e.g., one at a time, N chunks in parallel, etc.) and the uncompressed storage volume is not deleted until all chunks have been successfully compressed and validated. If master/slave copies of the storage volume are maintained, then both may be maintained until compression is completed and duplicate copies of the compressed storage volume are generated. As mentioned, compression and decompression operations may be performed in accordance with a schedule if an attachment/detachment schedule has been determined from the attachment metrics described above.

Decision block 304 determines whether there are any storage volumes which, based on their detected detachment/re-attachment schedules, should be scheduled for decompression. If so, then block 307 (FIG. 3B) is implemented; if not, then decision block 305 is implemented.

Turning first to 305 in FIG. 3B, a request to attach a partially compressed or fully compressed storage volume is received. The request may originate, for example, from a client connected to a particular compute instance. If the storage volume is only partially compressed, then at 306, the uncompressed storage volume is simply reattached and the partially compressed set of "chunks" are discarded. As previously mentioned, in some embodiments, the uncompressed volume and/or the slave copy of the uncompressed volume are not deleted until all chunks have been successfully compressed and the compression validated—thereby preserving the durability of the storage volumes.

If the storage volume is fully compressed (and the uncompressed storage volumes are no longer available), then at 307 in FIG. 3B an empty copy of the uncompressed storage volume is generated and re-attached to the instance. At 308, a decompression schedule is set based on the activity map associated with the data volume and, at 309, decompression is performed in accordance with the decompression schedule. For example, those chunks of data which are read more frequently may be decompressed first and immediately added to the empty copy of the storage volume. The instance may then gain access more quickly to those portions of the storage volume data which it is likely to need. Those chunks of data with a mixture of read and write operations may be decompressed next, followed by the write-only chunks. In addition, at 309, if any chunks have been overwritten by the instance during the decompression process, then decompression of those chunks can be cancelled (i.e., because they are no longer needed). Decompressing volumes in this manner hides the latency of decompression and makes it transparent to the user.

The operations illustrated in FIG. 3A-3B may performed in a different order than illustrated and, in one embodiment, are performed in parallel for multiple instances. Moreover, one or more of the illustrated operations may be performed over a network using asynchronous, packet-based transactions between the compute instances 101-103, the block storage servers 110-111, the volume monitoring service 200, and/or the various other components described herein.

Figure 4:
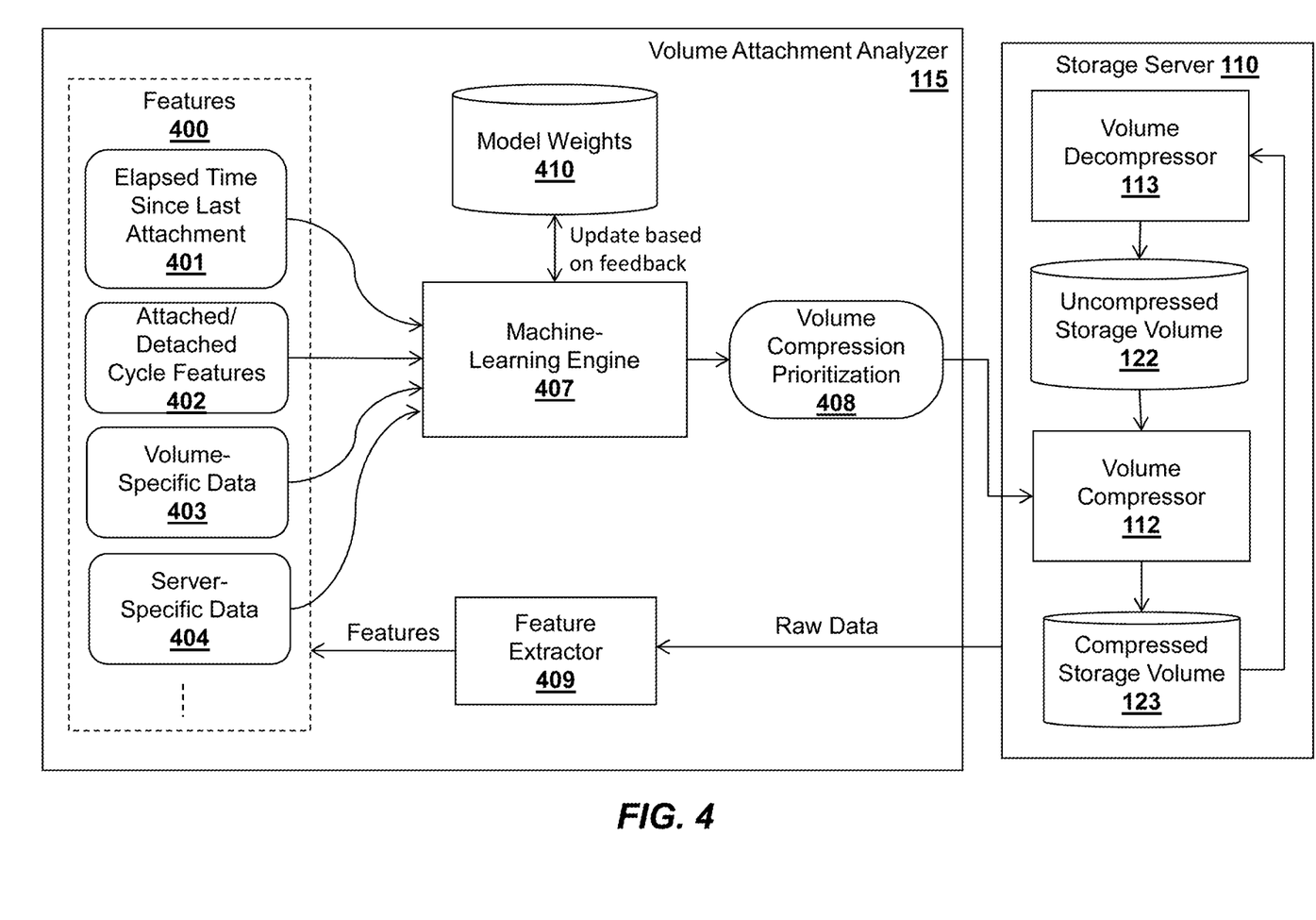
FIG. 4 illustrates one embodiment which uses machine learning for selecting storage volumes for compression.

As mentioned, machine learning and/or statistical modeling is used in one embodiment to prioritize and/or identify those volumes in the detached state which should be compressed. FIG. 4 illustrates one such embodiment which includes a machine-learning engine 407 to determine volume compression prioritizations 408 based on a set of features 400 associated with each of the volumes. A statistical or machine learning model such as an Empirical Bayes model may be used where each volume is initially assumed to behave in the same way as the general case in the storage fleet. As more data is accumulated on each individual volume, the model's estimate is refined for each specific storage volume, effectively establishing a correlation between the various features 400 and the likelihood that the storage volume will be reattached (e.g., within a designated period of time). One embodiment is formulated as a regression problem such as estimating the number of days that will elapse before a given volume is re-attached. Another embodiment performs a classification implementation to determine which volumes will be re-attached in the next designated time period (e.g., a week, month, 6 months, etc.).

A feature extractor 409 collects raw data from each of the storage servers (although only storage server 110 is shown in FIG. 4 for simplicity) to identify features 400 which can be used by the machine learning engine 407 to establish correlations with a likelihood of storage volume reattachment.

In yet another embodiment, the storage volumes are ranked in decreasing probability of being attached over the next designated time period. This ranking provides the order in which volumes should be compressed, with the least likely to be re-attached compressed first. To train the model, features are generated for each storage volume.

By way of example, and not limitation, the features 400 illustrated in FIG. 4 include features related to the time elapsed since the last volume attachment 401, features related to the number of times the volume has cycled through the attached-to-detached state 402, and volume-specific data 403. Note that various other features may be used by the machine-learning engine 407 to the extent they are relevant to volume data compression or attachment characteristics. In one embodiment, the machine learning engine 407 learns using these (and other) features 400 by providing feedback on the accuracy with which the volumes were prioritized. The "accuracy" may be defined based on the extent to which the volume compression prioritization 408 generated by the machine-learning engine 407 matches the order in which the storage volumes are actually re-attached. Based on detected correlations between the features 400 and the order of re-attachments, the machine-learning engine 407 may assign model weights 410 to the features 400. Over time, new features 400 may be added and new weights 410 assigned to allow the machine-learning engine 407 to determine more precise correlations between the features 400 and the likelihood of volume reattachment (thereby providing a more accurate volume compression prioritization 408).

Returning to the specific features illustrated in FIG. 4, in general, the longer a volume is in the detached state, the less likely it is to be attached. Thus, the elapsed time since the last attachment feature 401 may provide a reasonable estimate of the order of re-attachment of the storage volumes by itself. Consequently, one embodiment of the machine-learning engine 407 may rely solely on this feature 401 to generate the volume compression prioritization 408.

In addition, the machine-learning engine 407 may base volume compression prioritization 408 on the attached/detached cycle features 402 such as the number of times the volume has cycled through the attached-to-detached states in a given time period (e.g., day, week, month), and the total since it was created. This is a measure of whether the volume is being re-attached on a regular cadence for a periodic workload. High numbers in this feature (especially the day window) indicate that the volume should not be compressed, as it is likely to be re-attached on a periodic basis. In addition to the number of times a storage volume cycled between attached/detached states, embodiments of the attached/detached cycle features 402 may include specific schedule data such as attachment and detachment dates/times for certain storage volumes. If a particular storage volume has been following a particular attachment/detachment schedule for a period of time, then it is likely that the storage volume will continue to follow that schedule. As such, this data may be used as a feature 400 for the machine-learning engine 407 to generate its volume compression prioritization 408.

In addition, the machine-learning engine 407 may utilize volume-specific data 403 to render the volume compression prioritization 408. By way of example, and not limitation, the volume-specific data 403 may include static parameters such as the volume type, volume size, number of used bytes, and/or provisioned IOPS may also be used. In one embodiment, the volume-specific data includes an indication of the type of data stored on the storage volume. This, in turn, may be used by the machine-learning engine 407 to determine the order of compression (e.g., ordering large volumes and/or volumes which are difficult to compress later in the order). In addition, the type of data stored on the volume (in addition to other volume-specific data) may be used by the machine-learning engine to identify a type of compression and/or a level of compression to be performed on the storage volume. For example, GZIP may be a more efficient compression type for certain types of data. In addition, if the underlying data is determined to be highly compressible (e.g., such as word processing or text documents), then a less CPU-intensive level of compression may be used (e.g., using the −2 setting for GZIP). In contrast, if the underlying data is determined to already be compressed or otherwise difficult to compress (e.g., such as ZIP files or JPEG images), then the volume may be assigned a lower ordering and/or a more CPU-intensive level of compression (e.g., the −9 setting in GZIP).

The machine-learning engine 407 may detect correlations between the type of volume and how likely it is to be attached. The number of bytes stored in a volume is another variable which is directly related to the estimated time to compress the volume and the potential space savings. As such, the bytes stored in a volume may be included as a feature of the volume-specific data 403 and used by the machine-learning engine 407 to generate the volume compression prioritization 408.

As mentioned, in some embodiments boot volumes 120 storing boot images 180 for instances 101-103 are generally not be compressed. Thus, one of the features 400 may include an indication as to whether each volume was last attached as a boot or data volume. If a volume is typically attached as a boot volume, then the machine-learning engine 407 may weigh this in favor of a relatively lower priority ranking, or may in some manner remove the volume from being scheduled for compression. Any latency in accessing a boot volume will be customer visible as they cannot access the machine until the operating system (OS) has loaded. In contrast, data volumes can only be mounted once the OS is loaded and running, so they are not as latency-sensitive. In one embodiment, if a boot volume has not been modified from the original machine image, it is deleted rather than compressed. Storage servers 110-111 in one embodiment allow faster volume creation from commonly-used boot volume master images.

In one implementation, a further feature evaluated by the machine learning engine 407 is server-specific data 404 indicating, for example, average data traffic or traffic patterns associated with each block storage server 110-111. This may include, for example, a forecast of foreground (disk traffic) and/or background (e.g., snapshot creation and volume rehydration) traffic for each block storage server 110-111 associated with one or more storage volumes which are candidates for compression. Compression and decompression is CPU-intensive, so volumes on lightly loaded storage servers can be compressed first. For example, if a storage server's CPU utilization is already near 100% due to existing customer activity, additional CPU load may cause extra latency for volume traffic, and delay background activities (e.g. volume hydration or snapshot creation).

Once a particular data volume 122 has been selected for compression, the volume compressor 112 generates the compressed data volume 123 without reducing durability. A "double-buffered" approach may be used in which a fully compressed volume copy 123 is created completely before the uncompressed data volume 122 is deleted. Both compressed and uncompressed volumes are stored in duplicate as with any block storage server volume. Because the source volume is detached, it cannot be modified during the compression process. In one embodiment, if a customer attaches a compute instance 101-103 to a volume while compression is in progress, the partially-compressed copy is deleted and the uncompressed volume is accessed as normal.

The following is an exemplary sequence of operations and associated data. The source data volume is divided into chunks (e.g., 512 kB chunks) with each chunk being compressed independently, and stored in the destination volume. A hash (or one-way function) is performed on each chunk to generate a signature that may subsequently be used to validate the data. In one particular implementation, each chunk has an MD5 checksum value created using a hash function which is used to validate the chunk following decompression.

In addition, while the compression is in progress, the destination compressed chunks may be mirrored to a second compressed volume to further improve durability. After all the chunks from the uncompressed volume have been compressed and stored in the destination compressed data volume 123, the source data volume 122 is deleted. To improve durability, the source data volume 122 (the master) and its mirror copy (the slave) are only deleted once the compression has completed on both the master and slave data volumes.

Figure 5:
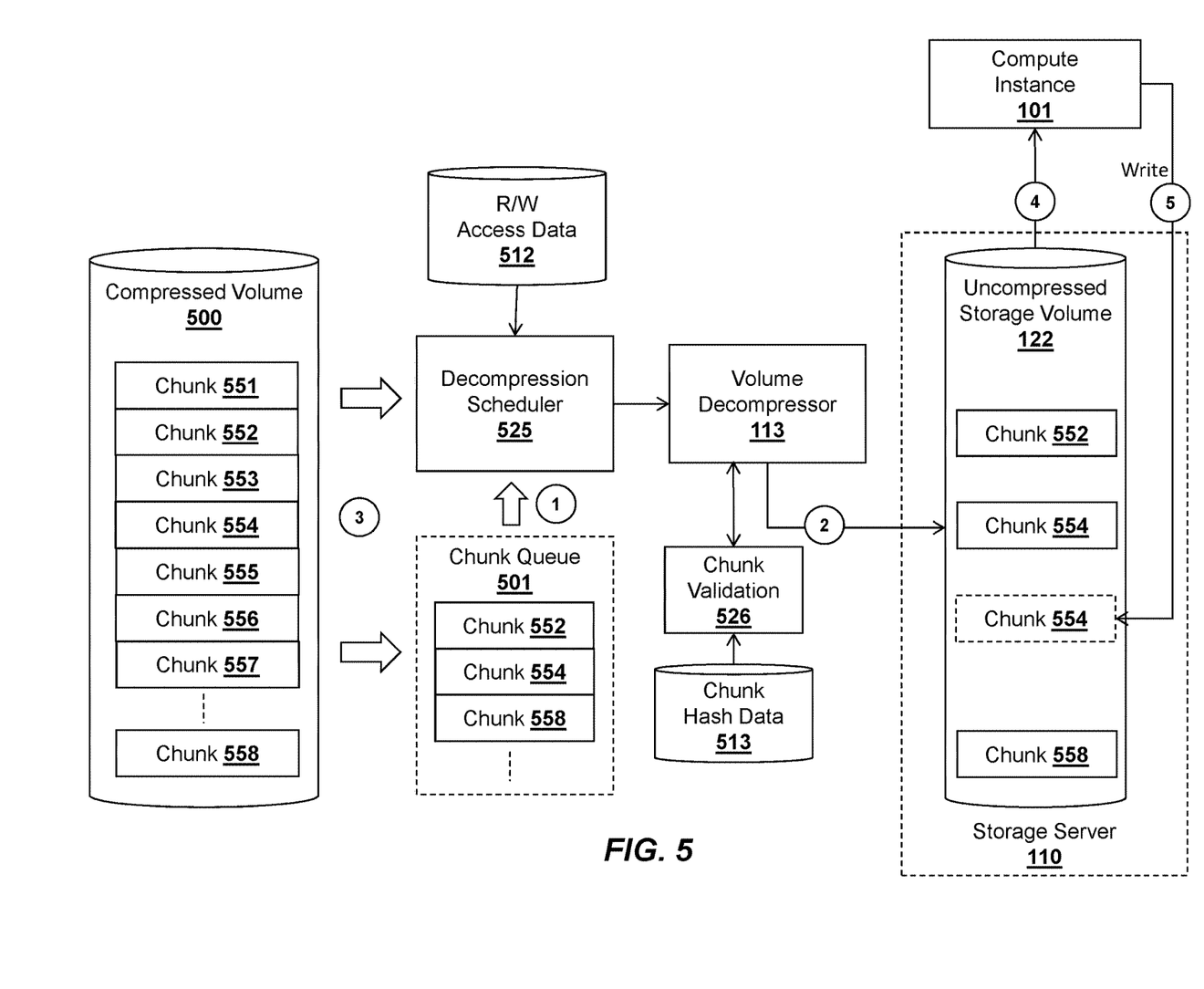
FIG. 5 illustrates one embodiment which subdivides storage volume data into chunks for compression.

When a customer creates a compute instance 101-103 and attaches a data volume thereto, one embodiment ensures that there is no difference in performance or latency between a compressed or uncompressed version. As mentioned above, data volumes may be subdivided into "chunks" for which read and write ("R/W") access is tracked over time. As illustrated in FIG. 5, in one embodiment, each storage server 110 stores the relative volume read and write accesses in a R/W access data structure 512 such as a data file or database. This data structure is then used by a decompression scheduler 525 to prioritize the order of chunk decompression by volume decompressor 113. A set of chunks 551-558 are illustrated within a compressed volume 500, which are scheduled for decompression by the decompression scheduler 525 in accordance with the R/W access data 512.

In one embodiment, a queue of chunks ("chunk queue") 501 is maintained in local memory or storage (e.g., within the volume monitoring service or storage server) to be readily scheduled as shown at (1) and decompressed as shown at (2) into the uncompressed data volume 122 (chunks 552, 554, 558 in the illustrated example). The remaining chunks (chunks 551, 553, 555-557) are read from the compressed volume 500, either directly into the compression scheduler 525 or into the chunk queue 501 as shown at (3). When the storage volume 122 is re-attached, a new (empty) copy of the uncompressed storage volume 122 is created on the server. This is immediately available for any customer reads of chunks which have been decompressed as shown at (4), and for writes as shown at (5) (in the same way as any block store volume). In the illustrated example, a chunk 554 is overwritten by the customer as shown at (5) before it can be decompressed. In such a case, the decompression of chunk 554 is cancelled (i.e., it has already been overwritten).

As mentioned, in one embodiment, customer reads have the highest priority, as the compute instance will be blocked until the read completes. These reads are immediately processed by the storage server 110 regardless of any other decompression activities. During the decompression process, the bytes consumed on the storage server 110 may be approximately 1.5× the uncompressed size in the worst case. This assumes a 50% compression ratio for the compressed volume, and the full size of the uncompressed volume. If the storage server 110 runs out of room, uncompressed volumes can be proactively remirrored to another storage server 111.

In one implementation, after each chunk is decompressed, a chunk validator 526 generates a hash over the chunk and compares the generated hash with chunk hash data 513 for the original uncompressed chunk. If the hash values match, the uncompressed chunk is validated and stored in the uncompressed storage volume 122. If the hash value does not match, the chunk is queued for decompression again by the decompression scheduler 525. As mentioned, the hash may be an MD5 checksum value. Only once all chunks have been decompressed, and every hash matches, will the compressed volume be deleted.

The described embodiments overcome problems in current storage implementations in which a significant amount of storage is consumed by inactive data stored in detached data volumes. These embodiments also ensure that the volume compression and decompression is performed transparently to the end user, without negatively impacting durability or performance.

Figure 6:
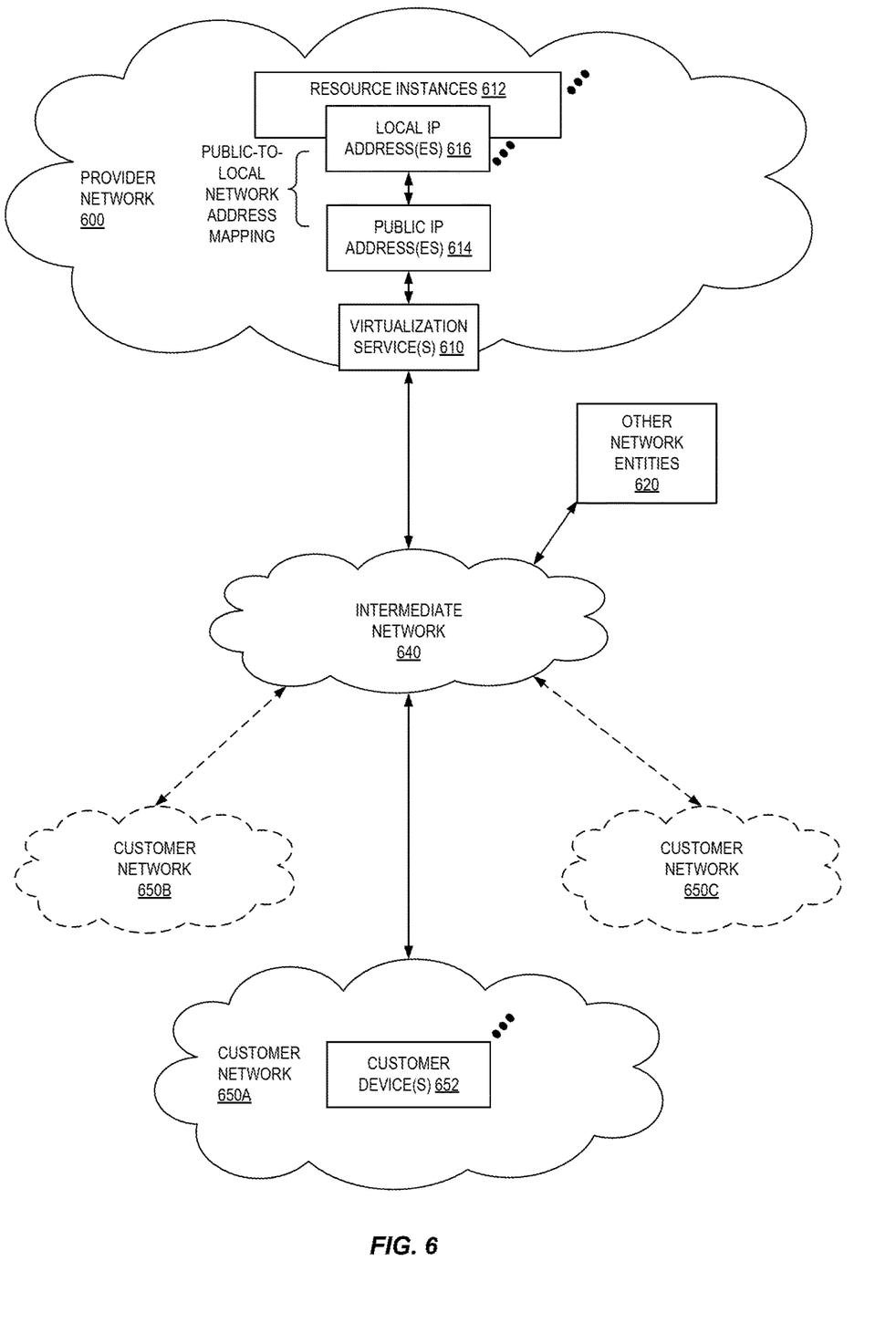
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local IP addresses 616 may be associated with the resource instances 612; the local IP addresses are the internal network addresses of the resource instances 612 on the provider network 600. In some embodiments, the provider network 600 may also provide public IP addresses 614 and/or public IP address ranges (for example, Internet Protocol version 4 (IPv4) or Internet Protocol version 6 (IPv6) addresses) that customers may obtain from the provider 600.

Conventionally, the provider network 600, via the virtualization services 610, may allow a customer of the service provider (for example, a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
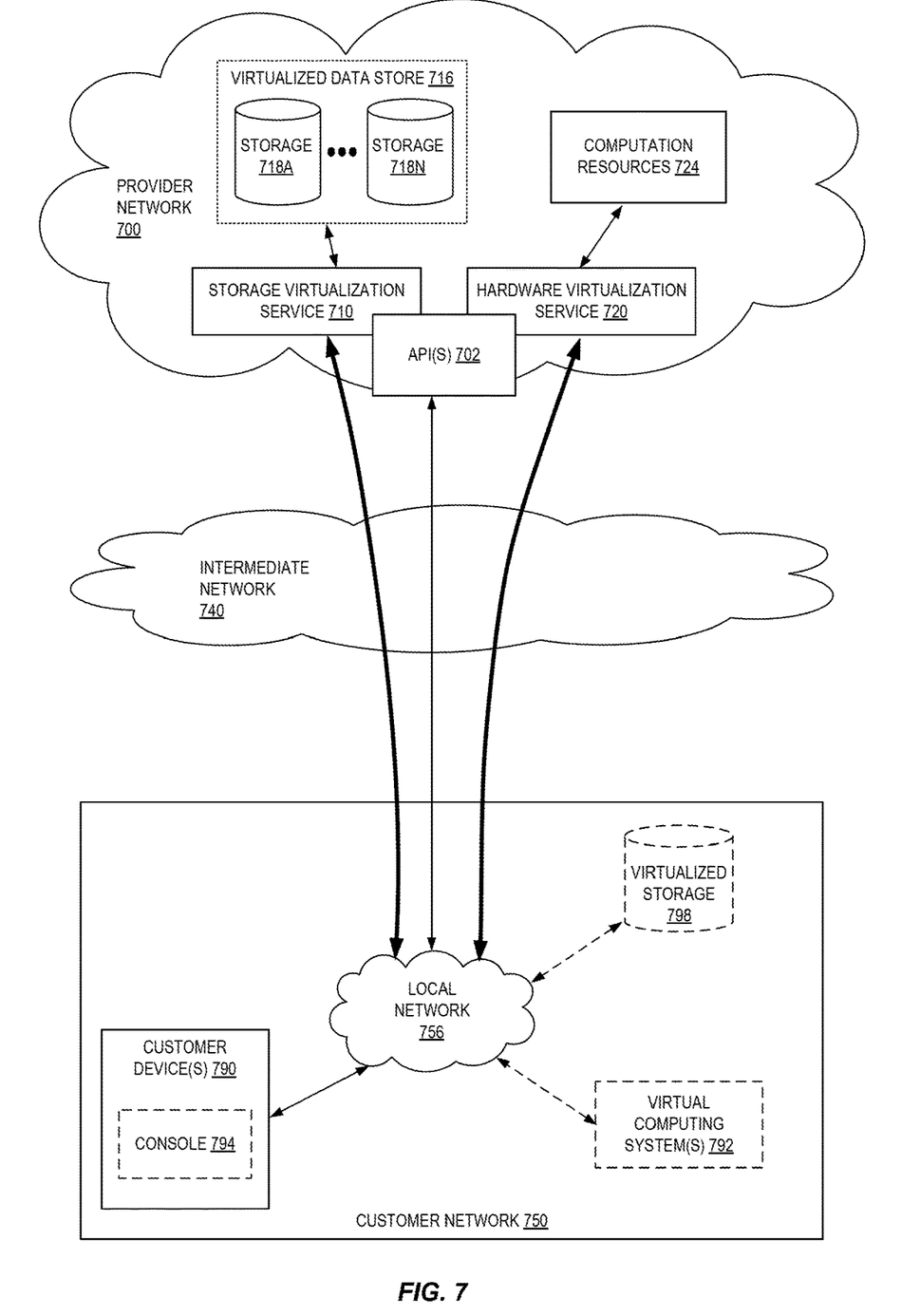
FIG. 7 is a block diagram of an example provider network that provides a storage virtualization service and a hardware virtualization service to customers according to some embodiments.

FIG. 7 is a block diagram of an example provider network that provides a storage virtualization service and a hardware virtualization service to customers, according to some embodiments. Hardware virtualization service 720 provides multiple computation resources 724 (for example, VMs) to customers. The computation resources 724 may, for example, be rented or leased to customers of the provider network 700 (for example, to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (for example, a web-based application, standalone application, mobile application, and so forth). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (for example, via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
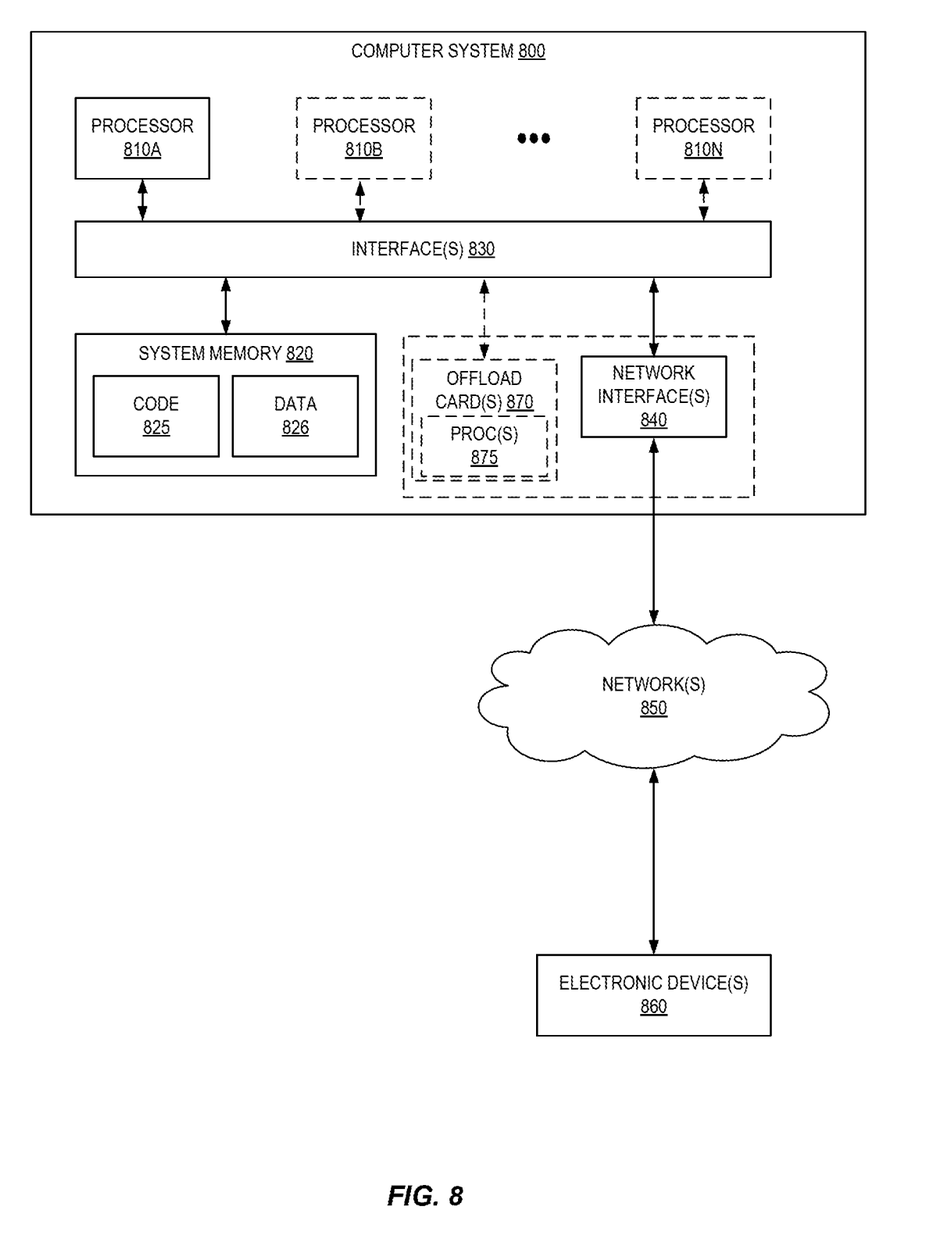
FIG. 8 is a block diagram illustrating an example computer system that may be used in some embodiments.

In some embodiments, a system that implements a portion or all of the techniques for volume compression/decompression as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (for example, two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (for example, system memory 820) into a format suitable for use by another component (for example, processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (for example, a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (for example, operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, and so forth These management operations may, in some embodiments, be performed by the offload card(s) 870 in coordination with a hypervisor (for example, upon a request from a hypervisor) that is executed by the other processors 810A-810N of the computer system 800. However, in some embodiments the virtualization manager implemented by the offload card(s) 870 can accommodate requests from other entities, and may not coordinate with (or service) any hypervisor.

Users of service provider systems may operate for the benefit of different entities. An entity may be a formal or informal organization such as a business, non-profit, governmental unit, educational group, shared-interest group, union, collective, etc., and thus the user may act on behalf of (or as part of) the entity. However, an entity may also be an individual person. Within the context of the service provider system, an entity may establish an account (or possibly multiple accounts), where each account is associated with one or more users (or "user accounts").

In some embodiments, system memory 820 may be one embodiment of a computer-accessible medium configured to store program instructions and data as described above for FIG. 1 for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 800 via I/O interface 830. A non-transitory computer-accessible storage medium may also include any volatile or non-volatile media such as RAM (for example, SDRAM, double data rate (DDR) SDRAM, SRAM, and so forth), read only memory (ROM), and so forth, that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, for example, disk or DVD/CD-ROM, volatile or non-volatile media such as RAM (for example, SDRAM, DDR, RDRAM, SRAM, and so forth), or ROM, as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 550A-C) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   compiling attachment metrics for block storage volumes of a service provider system, the attachment metrics including temporal data related to block storage volume detachments and attachments in relation to a plurality of compute instances, wherein the block storage volumes comprise a plurality of attached block storage volumes and a plurality of detached block storage volumes;
   determining a set of detached block storage volumes from the plurality of detached block storage volumes to be compressed and an order in which to compress the set of detached block storage volumes based on the attachment metrics; and
   compressing the set of detached block storage volumes in the order, wherein compression of a first detached block storage volume comprises subdividing the first detached block storage volume into data chunks of a specified size and independently performing compression on the data chunks to generate a plurality of compressed data chunks.

2. The computer-implemented method of claim 1 wherein the order in which to compress the set of detached block storage volumes comprises generating a relative ranking of the set of detached block storage volumes as compression candidates, the computer-implemented method further comprising:
   maintaining an uncompressed copy of the first detached block storage volume during the compression of the first detached block storage volume;
   detecting an attachment request associated with the first detached block storage volume;
   responsively discarding any compressed data chunks and attaching the first detached block storage volume if compression of the first detached block storage volume has not been completed and/or if the uncompressed copy of the first detached block storage volume is available; and
   responsively initiating decompression of the compressed data chunks if compression of the first detached block storage volume was completed and/or if the uncompressed copy of the first detached block storage volume is not available.

3. The computer-implemented method of claim 2 wherein the relative ranking of the set of detached block storage volumes indicates an estimated order in which the set of detached block storage volumes will be re-attached and/or an estimated order in which the block storage volumes will be re-attached within a specified time period.

4. A computer-implemented method comprising:
   compiling attachment metrics for block storage volumes, the attachment metrics including temporal data related to block storage volume detachments and attachments, wherein the block storage volumes comprise a plurality of attached block storage volumes and a plurality of detached block storage volumes;
   determining an ordering for compression of two or more detached block storage volumes from the plurality of detached block storage volumes based on the attachment metrics; and
   compressing the two or more detached block storage volumes in accordance with the ordering.

5. The computer-implemented method of claim 4 wherein compression of a first detached block storage volume comprises subdividing the first detached block storage volume into data chunks of a specified size and independently performing compression on the data chunks to generate a plurality of compressed data chunks.

6. The computer-implemented method of claim 5 further comprising:
   compiling volume-specific data related to each of the block storage volumes, the volume-specific data including one or more of a storage volume type, a storage volume size, a number of bytes used in each storage volume, a type of data stored in each storage volume, and/or provisioned operations per second for each storage volume;
   ordering the compression of the two or more detached block storage volumes based, at least in part, on the volume-specific data; and
   selecting a type of compression and/or a level of compression based, at least in part, on the volume-specific data.

7. The computer-implemented method of claim 6 further comprising:

maintaining an uncompressed copy of the first detached block storage volume during the compression of the first detached block storage volume;

detecting an attachment request associated with the first detached block storage volume;

responsively discarding any compressed data chunks and attaching the first detached block storage volume if compression of the first detached block storage volume has not been completed and/or if the uncompressed copy of the first detached block storage volume is available; and responsively initiating decompression of the compressed data chunks if compression of the first detached block storage volume was completed and/or if the uncompressed copy of the first detached block storage volume is not available.

8. The computer-implemented method of claim 7 wherein the ordering of the two or more detached block storage volumes comprises a relative ranking of the block storage volumes, the relative ranking indicating an estimated order in which the block storage volumes will be re-attached once detached and/or an estimated order in which the block storage volumes will be re-attached within a specified time period.

9. The computer-implemented method of claim 5 further comprising:

monitoring read and write operations directed to each data chunk of the first detached block storage volume while the first detached block storage volume is attached to a first compute instance; and storing an indication of the read and write operations for each data chunk in a read/write storage structure.

10. The computer-implemented method of claim 9 wherein after the first detached block storage volume has been detached and all of the data chunks of the first detached block storage volume have been compressed:

receiving a request to re-attach the first detached block storage volume; and prioritizing decompression of the data chunks based on the indication of the read and write operations.

11. The computer-implemented method of claim 10 wherein prioritizing decompression of the data chunks comprises assigning data chunks which are read more frequently a relatively higher priority than those data chunks which are read less frequently.

12. The computer-implemented method of claim 4 wherein determining an ordering for compression of the two or more detached block storage volumes comprises performing machine learning using a feature set related to the attachment metrics.

13. The computer-implemented method of claim 12 wherein the feature set comprises a first feature of elapsed time since a last attachment of the plurality of detached block storage volumes, a second feature comprising measured attached/detached cycles of the plurality of detached block storage volumes, a third feature comprising volume-specific data, and/or a fourth feature comprising server-specific data related to a respective storage server to which each of the plurality of detached block storage volumes is attached.

14. The computer-implemented method of claim 13 wherein the volume-specific data comprises one or more of a block storage volume type, a block storage volume size, a number of block storage volume bytes used, and/or a per-volume input/output operations per second (TOPS).

15. A system comprising:

a plurality of compute instances;

a plurality of block storage volumes to be selectively attached to the plurality of compute instances; and one or more servers comprising at least one memory to store program code and at least one processor to process the program code to:

compile attachment metrics for the block storage volumes, the attachment metrics including temporal data related to block storage volume attachments and detachments in relation to the plurality of compute instances, wherein the block storage volumes comprise a plurality of attached block storage volumes and a plurality of detached block storage volumes;

determine an order for compression of two or more detached block storage volumes determined from the plurality of detached block storage volumes based on the attachment metrics; and compress the two or more detached block storage volumes in accordance with the ordering.

16. The system of claim 15 wherein to compress a first detached block storage volume, the one or more servers are to subdivide the first detached block storage volume into data chunks of a specified size and to independently compress each of the data chunks to generate a plurality of compressed data chunks.

17. The system of claim 16 wherein to determine the order for the compression of the two or more detached block storage volumes, the one or more servers are to generate a compression priority list comprising a relative ranking of block storage volumes as compression candidates.

18. The system of claim 17 wherein the one or more servers are further to:

maintain an uncompressed copy of the first detached block storage volume during the compression of the first detached block storage volume;

attach the first detached block storage volume to a compute instance in response to detecting an attachment request; and responsively initiate decompression of the compressed data chunks when compression of the first detached block storage volume was completed and/or the uncompressed copy of the first detached block storage volume is not available.

19. The system of claim 18 wherein the relative ranking indicates an estimated order in which the block storage volumes will be re-attached once detached and/or an estimated order in which the block storage volumes will be re-attached within a specified time period.

20. The system of claim 16 wherein the one or more servers are further to:

monitor read and write operations directed to each data chunk of the first detached block storage volume while the first detached block storage volume is attached to a first compute instance and to store an indication of the read and write operations for each data chunk in a read/write storage structure.

* * * * *